(12) United States Patent
Bonanno et al.

(10) Patent No.: US 11,702,198 B2
(45) Date of Patent: Jul. 18, 2023

(54) ROTOR FOR A HOVER-CAPABLE AIRCRAFT

(71) Applicant: LEONARDO S.P.A., Rome (IT)

(72) Inventors: Dario Bonanno, Samarate (IT); Phil Woody, Samarate (IT); Alexandros Stefanakis, Samarate (IT); Vita Imperiale, Samarate (IT)

(73) Assignee: LEONARDO S.P.A., Rome (IT)

( * ) Notice: Subject to any disclaimer, the term of this patent is extended or adjusted under 35 U.S.C. 154(b) by 232 days.

(21) Appl. No.: 17/295,974

(22) PCT Filed: Sep. 30, 2019

(86) PCT No.: PCT/IB2019/058291
§ 371 (c)(1),
(2) Date: May 21, 2021

(87) PCT Pub. No.: WO2020/109880
PCT Pub. Date: Jun. 4, 2020

(65) Prior Publication Data
US 2022/0009624 A1    Jan. 13, 2022

(30) Foreign Application Priority Data
Nov. 30, 2018    (EP) ........................................ 8209448

(51) Int. Cl.
*B64C 27/473*    (2006.01)
(52) U.S. Cl.
CPC .... *B64C 27/473* (2013.01); *B64C 2027/4736* (2013.01)
(58) Field of Classification Search
CPC ...................... B64C 27/473; B64C 2027/4736
See application file for complete search history.

(56) References Cited

U.S. PATENT DOCUMENTS

| | | | |
|---|---|---|---|
| 3,237,697 A * | 3/1966 | Ford | B29D 99/0028 416/241 A |
| 3,967,996 A * | 7/1976 | Kamov | B29C 49/44 244/17.11 |

(Continued)

FOREIGN PATENT DOCUMENTS

| | | |
|---|---|---|
| EP | 2 415 665 | 2/2012 |
| EP | 3 246 247 | 11/2017 |

(Continued)

OTHER PUBLICATIONS

Gubarev B A—RU-2541574-C1 plus machine translation (Year: 2015).*
Barbier P R A—FR-2748719-A1 plus machine translation (Year: 1997).*

*Primary Examiner* — Juan G Flores
(74) *Attorney, Agent, or Firm* — Leason Ellis LLP

(57) ABSTRACT

A rotor is described that comprises: a hub; a plurality of blades; each blade extends along an axis and comprises: a leading edge and a trailing edge; a top surface and a bottom surface, a chord joining points of the leading edge and the trailing edge; and a closed shell made of composite material and adapted to withstand the torque directed along a first axis of the blade; the shell comprises a first and a second element separate from each other, delimiting the respective shell on mutually opposite sides; a first connection element arranged on the side of the associated leading edge and interposed between the first ends of the respective first and second elements; and a third element connected to the associated first and second elements and arranged on the side of the leading edge; the first connection element is connected to respective first faces, and the third element is connected to respective second faces of the first and second elements; the blade comprises a fourth element interposed between the fourth element and the first connection element.

13 Claims, 2 Drawing Sheets

(56) References Cited

U.S. PATENT DOCUMENTS

| | | | | |
|---|---|---|---|---|
| 4,095,322 | A * | 6/1978 | Scarpati | B29C 70/345 |
| | | | | 29/889.6 |
| 5,248,242 | A | 9/1993 | Lallo et al. | |
| 5,346,367 | A | 9/1994 | Doolin et al. | |
| 8,800,145 | B2 * | 8/2014 | Mukherji | B26F 3/004 |
| | | | | 29/889.1 |
| 10,633,084 | B2 * | 4/2020 | Hampton | B64F 5/40 |
| 10,723,438 | B2 * | 7/2020 | Measom | B29C 70/86 |
| 10,858,090 | B2 * | 12/2020 | Measom | B29C 70/446 |
| 2010/0162565 | A1 * | 7/2010 | Mukherji | B26F 3/004 |
| | | | | 83/53 |
| 2015/0064013 | A1 * | 3/2015 | Measom | B64C 27/473 |
| | | | | 29/889.71 |
| 2019/0061930 | A1 * | 2/2019 | Hampton | B64C 27/473 |

FOREIGN PATENT DOCUMENTS

| | | |
|---|---|---|
| EP | 3 246 248 | 11/2017 |
| EP | 3293 110 | 3/2018 |
| GB | 1 109 552 | 4/1968 |
| RU | 2 541 574 | 2/2015 |

* cited by examiner

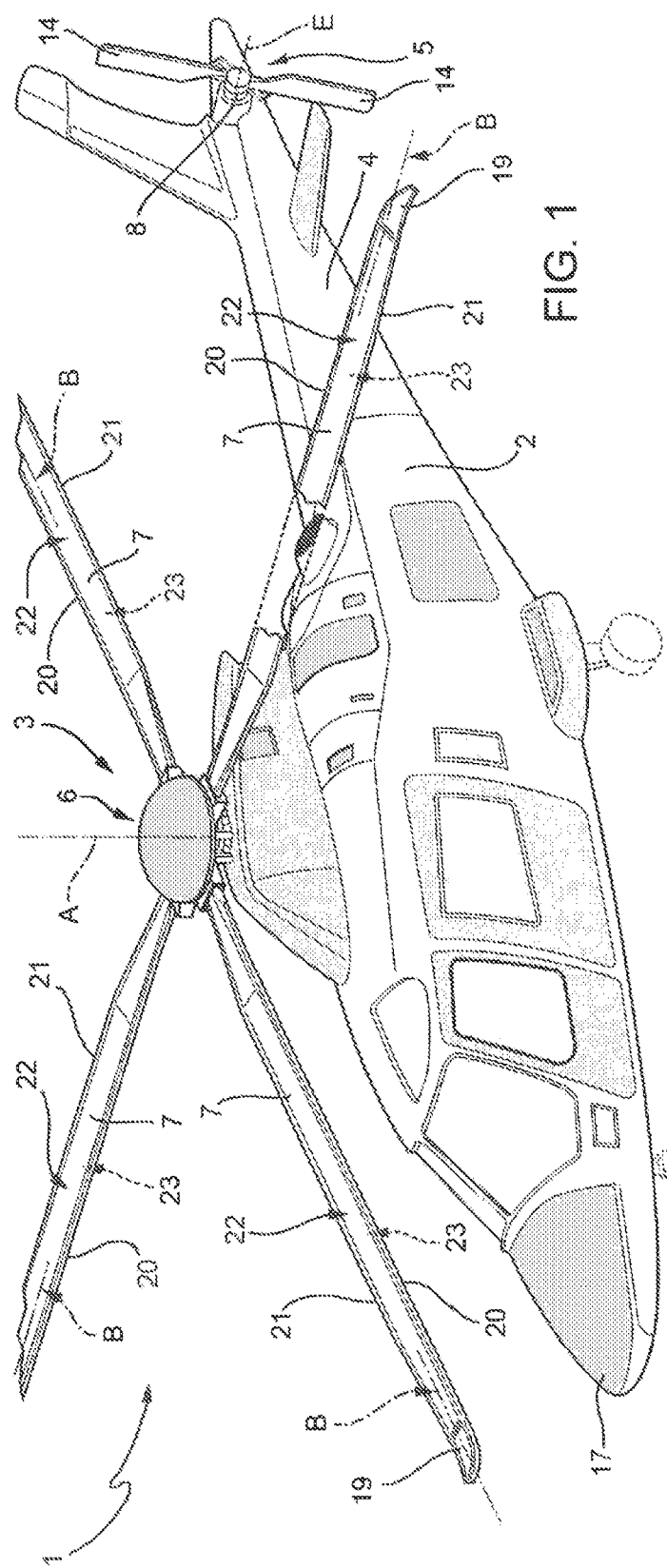
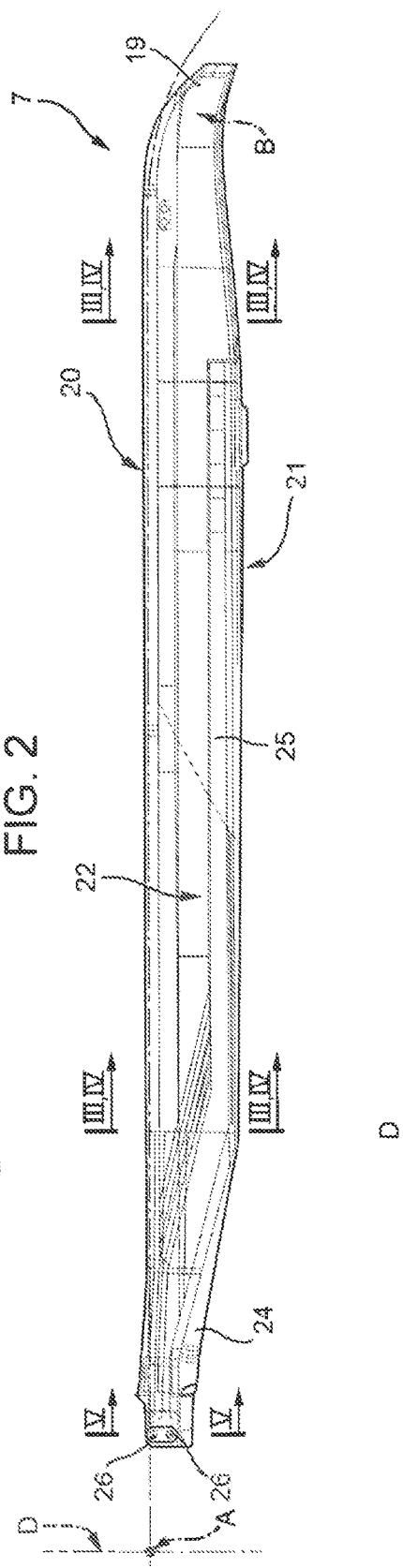
FIG. 1
FIG. 2

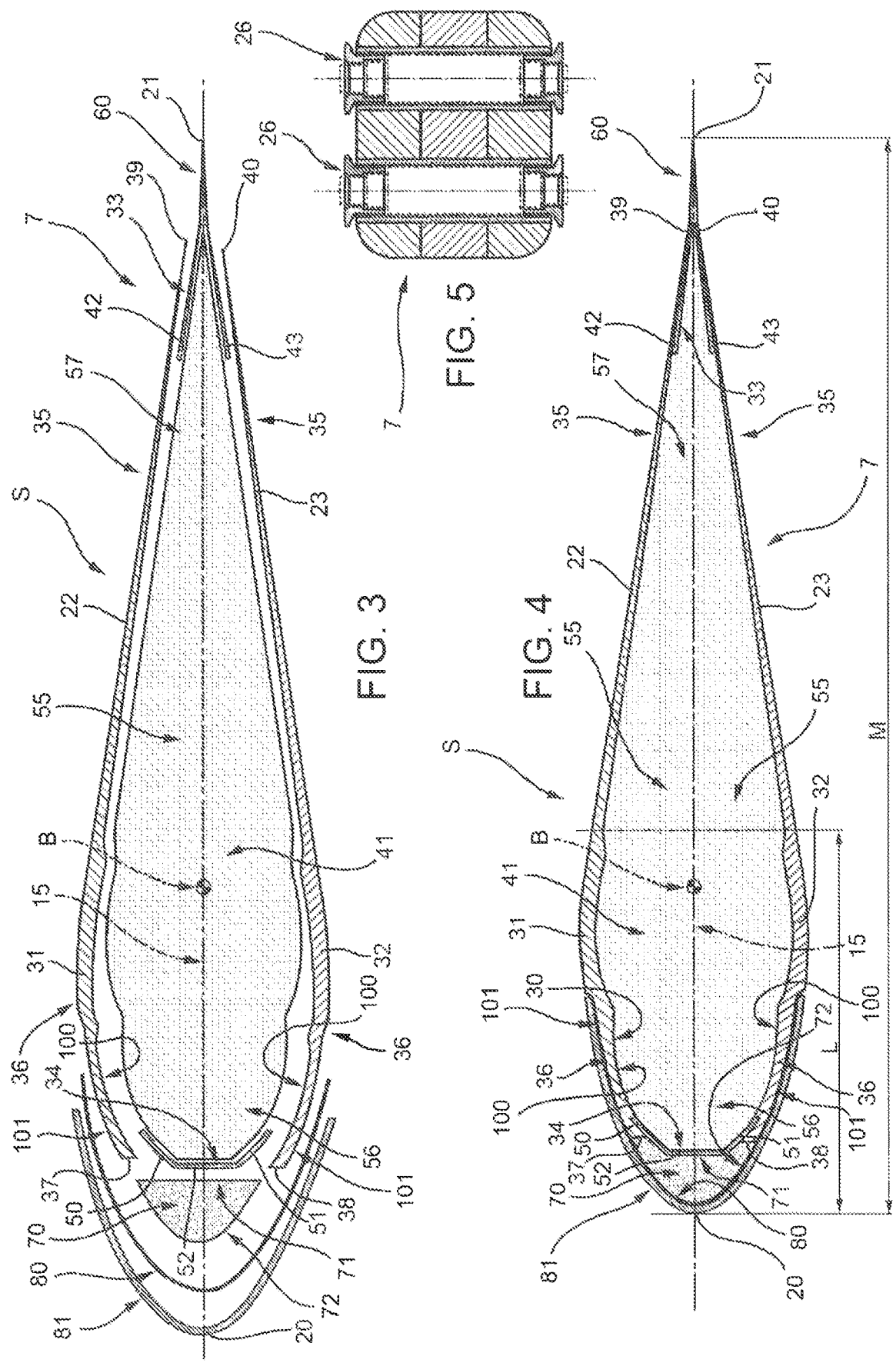

ROTOR FOR A HOVER-CAPABLE AIRCRAFT

CROSS-REFERENCE TO RELATED APPLICATIONS

This patent application is a U.S. National Phase Application under 35 U.S.C. 571 371 of International Patent Application No. PCT/IB2019/058291, filed on Sep. 30, 2019, which claims priority from European patent application no. 18209448.2, filed on Nov. 30, 2018, all of which are incorporated herein by reference, as if expressly set forth in their respective entireties herein.

TECHNICAL FIELD

The present invention relates to a rotor for a hover-capable aircraft, in particular for a convertiplane or helicopter.

Alternatively, the aircraft could be an autogyro or a gyrodyne.

The aircraft could be piloted by a crew or self-piloting.

BACKGROUND ART

As is known, helicopters comprise a fuselage, a main rotor projecting from the fuselage and rotatable about a first axis, and a tail rotor projecting from a tail portion of the fuselage and rotatable about a second axis transverse to the first axis.

In particular, the main rotor is adapted to provide the lift necessary to sustain the helicopter in the air and to allow forward, rearward and sideways movement of the helicopter. Inc tail rotor is instead adapted to counter the rotation of the helicopter that would be caused by operation of the main rotor, and to allow yawing, i.e. the rotation of the helicopter about the first axis.

In a known manner, the main rotor (or the tail rotor) comprises a mast (or drive shaft), a hub driven in rotation by the mast, and a plurality of blades hinged on the hub and extending along respective third axes transverse to the first axis.

When rotating about the first axis, the radially outer tips of each blade describe an imaginary circumference known as the "rotor disc".

Each blade, in turn, comprises:
a leading edge and a trailing edge; and
a top surface and a bottom surface defining respective surfaces opposite to each other and extending between the leading edge and the trailing edge.

In particular, following the forward movement of the blade, the leading edge interacts with the air before the trailing edge.

Still more precisely, each blade must have a certain profile in a section orthogonal to the respective third axis in order to generate the required level of lift following the interaction with the air.

Each blade must also be able to withstand the loads generated by aerodynamic effects and the centrifugal force. These loads substantially correspond to:
an axial load directed substantially along the third axis;
torque directed substantially parallel to the third axis;
a first bending moment directed orthogonally to the rotor disc plane and acting in a so-called flapping plane of the blade; and
a second bending moment directed in the rotor disc plane and acting in a so-called drag plane of the rotor disc.

According to a traditional type of solution, each blade in turn comprises:
a spar extending along the respective third axis and designed to support the axial load, torque and bending moments;
a filler made of a honeycomb material or Rohacell and is adapted to give the desired aerodynamic shape to the blade; and
a skin defining the top surface and the bottom surface of the blade.

RU-C-2541574 describes a blade without spars for a helicopter.

In particular, the blade comprises:
an open C-shaped half-shell, made in a single piece and joined to the skin so as to form a torsion-resistant shell, which extends up to the trailing edge of the blade,
a region delimited between an edge of the half-shell opposite to the trailing edge and the leading edge of the blade; and
a filler, which is housed inside the half-shell.

The filler is normally formed, for example, by a honeycomb material.

The aforementioned region is filled with the filler, except for some sections where a mass adapted to balance the blade is housed.

Stresses on the blade are greater at the mounting sections to the hub.

In these hub mounting sections, the half-shell of the blade shown in RU-C-2541574 comprises a pair of further mutually parallel inserts.

EP-A-2415665 describes a further solution of a blade without spars for a helicopter.

More specifically, the blade without spars described in EP-A-2415665 comprises a plurality of ribs inclined with respect to the longitudinal extension axis of the blades, each rib extending between the leading and trailing edges of the blade.

In this solution, the bending moments are mainly supported by the skin and the ribs reduce the risk of peak-load elastic instability.

There is awareness in the industry of the need to reduce the overall manufacturing cost of blades.

In greater detail, there is awareness in the industry of the need to reduce the number of components of the blade.

There is also awareness in the industry of the need to manufacture blades with high axial and flexural rigidity in the drag plane of the blade and that, at the same time, are simple and inexpensive to manufacture.

EP-A-3293110 and U.S. Pat. No. 5,346,367 disclose a rotor blade with a spar.

EP-A-3246248 discloses a rotor according to the preamble of claim 1.

DISCLOSURE OF INVENTION

The object of the present invention is to provide a rotor for a hover-capable aircraft that satisfies at least one of the above-specified needs in a simple and inexpensive manner.

The aforesaid object is achieved by the present invention, in so far as it relates to a rotor for a hover-capable aircraft, as defined in claim 1.

The present invention also relates to a rotor for a hover-capable aircraft, as defined in claim 2.

BRIEF DESCRIPTION OF THE DRAWINGS

For a better understanding of the present invention a preferred embodiment is described hereinafter, purely by way of non-limitative example and with reference to the accompanying drawings, in which:

FIG. 1 is a perspective view of a helicopter comprising a rotor according to the present invention;

FIG. 2 is a top view of a blade of the rotor of FIG. 1;

FIG. 3 is an exploded cross-section of the blade of FIGS. 1 and 2 along the lines III-III and IV-IV of FIG. 2;

FIG. 4 is a cross-section of the blade of FIGS. 1 and 2 along the lines III-III and IV-IV of FIG. 2; and FIG. 5 is a cross-section of the blade of FIGS. 1 and 2 along the line V-V of FIG. 2

BEST MODE FOR CARRYING OUT THE INVENTION

Referring to FIG. 1, reference numeral 1 indicates an aircraft, in particular a hover-capable aircraft and, in the case shown, a helicopter.

The helicopter 1 basically comprises a fuselage 2, a main rotor 3 arranged on the top of the fuselage 2 and a tail rotor 5.

The fuselage 2 comprises, at its opposite ends, a nose 17 and a tail boom 4 supporting the tail rotor 5.

The main rotor 3, in turn, comprises:
a hub 6 rotatable about an axis A; and
a plurality of blades 7 extending from the hub 6 along respective axes B and hinged on the hub 6.

Similarly, the tail rotor 5, in turn, comprises a hub 8 rotatable about an axis F transverse to the axis A and a plurality of blades 14 extending from the hub 8 and hinged on the hub 8.

In the description below, reference shall be made, without loss of generality, to the main rotor 3.

It is important to underline that different types of rotors 3 are known, each of which contemplates a different embodiment of the hinging of the blades 7 on the hub 6.

The blades 7 of the rotor 3 have respective longitudinal extension axes B transversal to axis A and comprise respective tips 19 opposite to axis A.

In particular, during the relative rotation about the axis A and following the hinging of the blades 7 on the hub 6, the radially external tips 19 of each blade describe an imaginary circumference known as the "rotor disc".

Depending on the type of rotor 3, each blade 7 has one or more rotational degrees of freedom with respect to the hub 6.

These rotational degrees of freedom correspond to (FIG. 2):
an incidence angle, which is associated with a rotation about an axis B such as to allow varying the incidence angle of the blade 7;
a drag angle, which is associated with a rotation about an axis C parallel to and offset with respect to the axis A such as to allow a lead-lag movement of the blade 7 in the rotor disc plane; and
a flap angle, which is associated with a rotation about an axis D transverse to the axes A, B and C such as to allow a flapping movement of rue blade 7 orthogonally to the rotor disc plane.

More specifically, depending on the type of rotor 3 and hinging of the blade, 7 on the hub 6, the aforementioned incidence, drag so and flap angles correspond to rotations that are rigid, semi-rigid or obtained through elastic deformation of the blades 7.

In use, the blade 7, following its rotation about the axis A. and the aerodynamic interaction with the airflow, is subjected to:

a centrifugal force directed substantially parallel to the axis B and in the opposite direction to the axis A;
torque directed along the axis B;
a first bending moment directed along the flap axis D; and
a second bending moment directed along the drag axis C.

More specifically, as all the blades 7 are identical, reference shall be made hereinafter, without loss of generality, to a single blade 7.

The blade 7, in turn, comprises:
a leading edge 20 and a trailing edge 21 opposite to each other; and
a top surface 22 and a bottom surface 23 defining respective surfaces opposite to each other, and extending between the leading edge 20 and the trailing edge 21.

In articular, following the, forward movement of the blade 7, the leading edge 20 interacts with the air before the trailing edge 21.

With reference to a section S of the blade in a plane orthogonal to the axis B (FIGS. 3 an 4), it is possible to identify a chord 15 of the blade 7, i.e. a segment joining the points of the trailing edge 21 and of the leading edge 20 in the section S.

Referring to FIG. 2, the blade 7 further comprises, proceeding along the axis B in a radially outward direction to the axis A.
a root portion hinged on, the hub 6 (FIG. 5);
a transitional portion 24, with a progressively increasing chord 15;
a main portion 25 (FIG. 2) with an almost constant chord 15; and
an end portion defining the tip 19.

In greater detail, the root portion comprises one or more bushed holes that allow rigid connection, via bolts 26, to a connection element (not shown) hinged on the hub 6, so as to enable varying the incidence, flap and drag angles of the blade 7.

In particular, the blade 7 comprises a thin-walled shell 30 provided to react to the torque, flapping lament, drag lament and centrifugal force.

The shell 30 comprises (FIGS. 3 and 4):
a pair of walls 31 and 32 separated from each other, delimiting the shell 30 on respective mutually opposite sides and arranged on the top surface 22 and on the bottom surface 23, and having respective ends 37 and 38 arranged on the side of the leading edge 20 and spaced apart from each other;
a connection element 34 arranged on the side of the leading edge 20 and interposed between the ends 37 and 38 of the respective walls 31 and 32;
a further connection element 80 connected to walls 31 and 32 and arranged on the side of the leading edge 20; and
a nose 70 interposed between the connection element 80 and the connection element 34.

The connection element 34 is connected to respective faces 100 of the walls 31 and 32, and the connection element 80 is connected to respective faces 101, opposite to faces 100, of the walls 31 and 32.

The shell 30 also comprises a further connection element 33 interposed between the top surface 22 and the bottom surface 23 and arranged on the side of the trailing edge 21.

In greater detail, walls 31 and 32 comprise respective end edges 39 and 40 arranged on the side of the trailing edge 21 and spaced apart from each other.

Faces 101 of the walls 31 and 32 respectively define the top surface 22 and the bottom surface 23 of the blade 7.

Faces 100 of the walls 31 and 32 are opposite to the faces 101 and are respectively arranged on the opposite side to the top surface 22 and on the opposite side to the bottom surface 23 of the blade 7.

The connection element 34 is connected to the faces 100 of the walls 31 and 32 on the side of the ends 37 and 38.

The element 80 is connected to the faces 101 of the walls 31 and 32 on the side of the ends 37 and 38.

The walls 31 and 32 initially diverge from and then converge towards one another, following the profile of the section proceeding from the end edges 39 and 40 towards the respective end edges 37 and 38.

The walls 31 and 32 have respective lies parallel to the lies of the top surface 22 and the bottom surface 23, respectively, and have a thickness orthogonal to the aforementioned lies.

The walls 31 and 32 further comprise, proceeding from the trailing edge 21 to the leading edge 20:
respective segments 35 of limited curvature; and
respective segments 36 of more pronounced curvature.

In the case shown, proceeding from the trailing edge 21 towards the leading edge 20, the thickness of segments 35 is constant for 65-70% of the length M of the chord 15.

The segments 36 are thicker than the respective segments 35 and are opposite to one another.

In greater detail, the distance L between the ends of the segments 36 opposite to the leading edge 20 and the leading edge 20, measured parallel to the chord 15 in section S, is equal to 30-35% of the length M of the chord 15.

The walls 31 and 32 partially define the top surface 22 and the bottom surface 23, respectively, of the blade 7.

Furthermore, the nose 70 is interposed between connection elements 34 and 80 along a direction parallel to the chord 15, with reference to section S.

Moreover, the nose 70 occupies a space delimited on one side by the element 80 and on the other side by the connection element 34 and by the ends 37 and 38 of the respective walls 31 and 32.

In the case shown, the nose 70 is made of a composite material, laminated parallel to the axis B.

The nose 70 is solid body without cavities in the case shown, and possibly integrated with discrete metal elements acting as inertial and balancing masses.

The space occupied by the nose 70 varies along the axis B depending on the profile of the blade 7 and the load to which the blade 7 is subjected.

In particular, the nose 70 is delimited by:
a wall 71, parallel to and superimposed on the wall 52; and
a curved wall 72, opposite to the wall 71 with respect to the shell 30.

The connection element 33 is arranged on the side of the trailing edge 21 and is connected to respective ends 39 and 40 of the walls 31 and 32, so as to close the shell 30 on the side of the trailing edge 21.

In the case shown, the connection element 33 is formed by one of the following, possibly coexisting, elements:
a pair of mutually incident straight walls 42 and 43 diverging apart from the trailing edge 21; and/or
a C-shaped connection element (not shown), at the end of the shell 30 on the side of the trailing edge 21.

The blade 7 further comprises:
a filler 41 housed inside the shell 30 and provided to give the desired aerodynamic shape to the blade 7; and
a stiffener 60 arranged on the opposite side of the shell 30 with respect to the nose 70, i.e. on the side of the trailing edge 21.

In the case shown, the filler 41 is made of a structural foam, in particular ROHACELL. Alternatively, the filler 41 could be made of a non-metallic honeycomb material.

In particular, the filler 41 comprises:
a main portion 55 interposed between the walls 31 and 32 and delimited at least in part by the faces 100; and
a tip portion 56 facing towards the leading edge 20 and housed inside a compartment defined by the connection element 34; and
a tip portion 57 facing towards the trailing edge 21 and housed inside a compartment defined by connection element 33.

The stiffener 60 is applied to the connection element 33 at the trailing edge 21.

The blade 7 further comprises:
the further connection element 80 surrounding and superimposed on the nose 70 on the opposite side of the filler 41;
a protective wall 81 defining the leading edge 20, surrounding the connection element 80 and applied to cover the connection element 80.

The connection element 80 and the wall 81 have a thin-walled structure.

The connection element 80 and the wall 81 have a C-shaped structure in section S.

The connection element 80 is interposed between the wall 81 and the nose 70 along the direction parallel to the chord 15, with reference to section S. The element 80 is composed of layers of composite material, in particular fibre-reinforced resin, laminated parallel to the direction B.

In one embodiment, said layers of composite material are integrated or combined with thin-walled heating elements (not shown) adapted to heat the leading edge 20, to prevent ice forming during the flight or favour the melting and the detachment of ice. Each heating element is, in particular, formed by a layer of conductive tracks made of copper or aluminium, interposed between two layers of fibre of composite material, in particular fibre-reinforced resin.

In the case shown, the walls 31 and 32, the connection elements 33 and 34, and the stiffener 60 are made of composite material, in particular fibre-reinforced resin.

The walls 31 and 32 are obtained via the lamination of layers in a direction parallel and transverse to the axis B (e.g. 45°); the connection elements 33 and 34, and the stiffener 60 are obtained via the lamination of layers in a direction parallel to the axis B.

The wall 81 is made of many elements, made of titanium or steel or nickel alloys, possibly integrated with adhesive outer layers made of polyurethane.

The top surface 22 of the blade 7 is thus defined by a portion of the wall 81, by a portion of the wall 31 and by a portion of the stiffener 60.

The bottom surface 23 of the blade 7 is defined by the remaining portion of the wall 81, by a portion of the wall 32 and by the remaining portion of the stiffener 60.

The leading edge 20 and the trailing edge 21 are defined by the end edges of the wall 81 and by the stiffener 60, respectively.

It is important to underline that the blade 7 is devoid of spars extending along the axis B.

The structural loads acting on the blade 7 are absorbed in the following manner.

The thicker segments 36 of the walls 31 and 32 and the nose 70 absorb the preponderant part of the centrifugal force.

The thicker segments 36 of the walls 31 and 32 enable the shell 30 to absorb the preponderant part of the bending-moment directed along the flap axis D.

This is because the thicker segments 36 are arranged opposite to each other with respect to a neutral axis associated with bending in the flapping plane, strengthening the section S of the blade 7 in the areas where the greater normal stress is generated as a result of the bending moment directed along axis D.

The nose 70 and the stiffener 60 absorb the preponderant part of the bending moment directed along the drag axis C.

This is because the nose 70 and the stiffener 60 are arranged opposite to each other with respect to a neutral axis associated with bending in the drag plane, thereby strengthening the section S of the blade 7 in the areas where the greater normal stress is generated as a result of the bending moment directed along the axis C.

The shell 30 formed by the walls 31 and 32 and by the connection elements 33, 34 and 80 absorbs the preponderant part of the torque directed along the axis B of the blade 7.

This is because the shell 30 creates a closed structure that exploits the entire area of the section S to withstand the tangential stress generated by the torque.

In use, the mast turns around the axis A driving the hub 6 and the blades 7 in rotation.

The functioning of the rotor 3 is described below only in relation to a single blade 7.

While it is driven by the hub 6, the blade 7 varies its orientation with respect to the hub 6.

In particular, following operation of the rotor 3, the blade 7 rotates about hub 6, and about the axes B, C and D by the incidence, drag and flap angles.

The aerodynamic interaction with the airflow and the rotation about the axis A cause the blade 7 to be subjected to:
- a centrifugal force directed substantially parallel to the axis B and in the opposite direction to the axis A;
- a torque directed along the axis B;
- a first bending moment directed along the flap axis D; and
- a second bending moment directed along the drag axis C.

More specifically, the thicker segments 36 of the walls 31 and 32 and the nose 70 absorb the preponderant part of the centrifugal force.

The thicker segments 36 of the walls 31 and 32 enable the walls 31 and 32 to absorb the preponderant part of the bending moment directed along the flap axis D.

The nose 70 and the stiffener 60 absorb the preponderant part of the bending moment directed along the drag axis C.

The shell 30 formed by the walls 31 and 32 and by the connection elements 33, 34 and 80 absorbs the preponderant part of the torque directed. along the axis B at the blade 7.

Furthermore, during operation of the rotor 3, the wall 81 protects the nose 70 and the leading edge 20 of the blade 7 from erosion due to solid particles and water normally present in the air.

From an examination of the rotor 3 produced according to the present invention, the advantages that can be achieved therewith are evident.

In particular, the shell 30 is formed by the walls 31 and 32, by the nose 70 and by the connection elements 33 and 80.

This enables increasing the axial rigidity of the blade 7 and the flexural rigidity in the drag plane orthogonal to axis F. The latter is raised because the nose 70 is arranged spaced apart from the axis B and at the leading edge 20 of the blade 7, i.e. at the maximum distance from the neutral axis of the section S resistant to the bending drag moment. This enables to arrange the nose 70 at the areas of the blade 70 where the bending crag moment generates the maximum normal stresses.

In this way, the blade 7 is able to offer the desired axial and flexural rigidity in the drag plane, without requiring the use of spars made of wood, metal or composite materials.

Moreover, although devoid of spars, the blade 7 does not require strengtheners parallel to the chord 15 in the sections S.

The shell 30 is delimited by the element 80 and by the connection elements 33 and 34, which have an open, thin-walled structure, symmetrical with respect to the chord 15 of the blade 7.

This enables simultaneously achieving, and without use of spars made of wood, metal or composite materials:
- high torsional rigidity, due to the fact that the shell 30 defines a closed thin-walled section resistant to torque; and
- high flexural rigidity in the flapping plane.

This flexural rigidity is increased because the portions 35 and 36 of the walls 31 and 32 are arranged spaced apart from the axis B, i.e. at the maximum distance from the neutral axis of the section S resistant to the bending flap moment. This enables arranging the material of the portions 35 and 36 of the walls 31 and 32 in the areas of the blade 70 where the bending flap moment generates the maximum normal stresses. Furthermore, the portions 35 and 36 of the walls 31 and 32 are symmetrical with respect to the axis B, along which the centrifugal force develops, contributing to the resistance to such loads.

Moreover, the connection element 34 is connected to the faces 100 of the walls 31 and 32, while the element 80 is connected to the faces 101 of the walls 31 and 32.

This allows increasing the connection surface between the wails 31 and 32, the element 80 and the connection element 34, thus correspondingly increasing the force that can be transmitted via said connection surfaces, for example, by gluing.

The nose 70 and the walls 31 and 32 are made as distinct and separate bodies.

This facilitates the production and lamination process of the nose 70 and the walls 31 and 32, and allows maximum flexibility thanks to the shapes assumed by the nose 70 and by the walls 31 and 32 in the different sections S of the blade 7.

In fact, it is possible to make the nose 70 and the walls 31 and 32 in single moulds of a particularly easily obtainable shape, though very adapted for depositing composite material, whether manually or via automated technologies, known as Automated Fibre Placement (AFP).

The blade 7 is thus without spars of any type or material, and the walls 31 and 32, connection elements 33 and 34, and the stiffener 60 are made of composite material.

Therefore, the blade 7 can be made, almost totally, via sub-elements made using the technology known as Automated Fibre Placement (AFP) and successively assembled using in-mould bonding procedures (co-curing, co-bonding and secondary bonding) with evident advantages in terms of manufacturing costs and times for the blade 7.

The wall 81 protects the nose 70 and the leading edge 20 of the blades 7 from erosion due to solid particles and water normal present in the air.

Finally, it is clear that modifications and variants can be made regarding the rotor 3 set forth herein.

In particular, the rotor 3 the blades could be a tail rotor of the helicopter 1 instead of the main rotor.

Instead of to the helicopter 1, the rotor 3 could be applied to a piloted or remotely-controlled convertiplane or gyrodyne.

Furthermore, the blade 7 or 14 could comprise localized masses added to statically balance the blade 7 or 14. These masses could occupy, only for some sections S of the blade the position of the nose 70.

Finally, the walls 42 and 43 of the connection element 33 could be gently connected instead of jointed in a sharp edge.

The invention claimed is:

1. A rotor (3, 5) for a hover-capable aircraft (1), comprising:
    a hub (6, 8); and
    a plurality of blades (7, 14) hinged on said hub (6, 8); each said blade (7, 14) extending along an axis (B) and, in turn, comprising:
    a leading edge (20) and a trailing edge (21), opposite to each other;
    a top surface (22) and a bottom surface (23), opposite to each other and extending between said leading edge (20) and said trailing edge (21);
    a chord (15) joining the points of said leading edge (20) and said trailing edge (21) in a section (S) of said blade (7, 14) orthogonal to said axis (B); and
    a closed shell (30) made of composite material and adapted to withstand the torque directed along said axis (B) of said blade (7, 14);
    said shell (30) comprising:
    a first and a second element (31, 32), separate from each other, delimiting the respective said shell (30) on mutually opposite sides and respectively arranged at said top surface (22) and said bottom surface (23) of the respective said blade (7, 14); said first and second elements (31, 32) of each said blade (7,14) comprising respective first ends (37, 38) arranged on the side of the associated leading edge (20) and spaced apart from each other;
    a first connection element (34) arranged on the side of the associated leading edge (20) and interposed between said first ends (37, 38) of the respective first and second elements (31, 32); and
    a third element (80) connected to the associated said first and second elements (31, 32) and arranged on the side of the leading edge (20);
    said first connection element (34) being connected to respective first faces (100) of said first and second elements (31,32);
    said first faces (100) being respectively arranged on the opposite side of said top surface (22) and on the opposite side of said bottom surface (23) of said blade (7);
    said blade (7,14) further comprising a fourth element (70) interposed between said third element (80) and said first connection element (34);
    characterized in that said third element (80) is connected to respective second faces (101) opposite to corresponding said first faces (100) of said first and second elements (31, 32);
    said first and second elements (31, 32) of each said blade (7, 14) respectively having, at least in part, a lie substantially parallel to a lie of the corresponding said top surface (22) and bottom surface (23) of the blade (7, 14);
    said first and second elements (31, 32) of each said blade (7, 14) having a thickness in the transverse direction to the lie of the respective said top surface (22) and bottom surface (23);
    said first and second elements (31, 32) respectively comprising a first and a second portion (36) opposite to each other and having greater thickness than respective remaining parts (35) of the respective said second and third elements (31, 32);
    an extension (L) of said first and second portions (36) parallel to said chord (15) in said section (S) ranging between 30% and 35% of a length (M) of said chord (15) in said section (S).

2. The rotor according to claim 1, characterized in that said first and second elements (31, 32) of each said blade (7, 14) have respective second ends (39, 40) opposite to said first ends (37, 39) and arranged on the side of the associated trailing edge (21);
    said second ends (39, 40) of said first and second elements (31, 32) of each said blade (7, 14) being spaced apart from each other.

3. The rotor according to claim 2, characterized in that each said blade (7, 14) comprises, on the side of the associated trailing edge (21), a second connection element (33) interposed between said second ends (39, 40) of the respective first and second elements (31, 32).

4. The rotor according to claim 3, characterized in that said first and second connection elements (33, 34) have, in said section (S), respective open thin-wall profiles, symmetrical with respect to said chord (15).

5. The rotor according to claim 3, characterized in that at least one of said first, second and fourth elements (31, 32, 70) and/or said first and second connection elements (33, 34) is made of a composite material.

6. The rotor according to claim 5, characterized in that said shell (30) of each said blade (7, 14) is filled with a foam or honeycomb material (41) adapted to provide the desired shape to the blade (7, 14).

7. The rotor according to claim 6, characterized in that each said blade (7, 14) is devoid of spars.

8. The rotor according to claim 1, characterized in that said third element (80) is arranged in abutment against said fourth element (70).

9. The rotor according to claim 8, characterized in that each said blade (7, 14) comprises a protective element (81) defining said associated leading edge (20) and superimposed, at least in part, on the associated said third element (80).

10. A rotor (3, 5) for a hover-capable aircraft (1), comprising:
    a hub (6, 8); and
    a plurality of blades (7, 14) hinged on said hub (6, 8); each said blade (7, 14) extending along an axis (B) and, in turn, comprising:
    a leading edge (20) and a trailing edge (21), opposite to each other;
    a top surface (22) and a bottom surface (23), opposite to each other and extending between said leading edge (20) and said trailing edge (21);
    a chord (15) joining the points of said leading edge (20) and said trailing edge (21) in a section (S) of said blade (7, 14) orthogonal to said axis (B); and
    a closed shell (30) made of composite material and adapted to withstand the torque directed along said axis (B) of said blade (7, 14);
    said shell (30) comprising:
    a first and a second element (31, 32), separate from each other, delimiting the respective said shell (30) on mutually opposite sides and respectively arranged at said top surface (22) and said bottom surface (23) of the respective said blade (7, 14); said first and second elements (31, 32) of each said blade (7, 14) comprising respective first ends (37, 38) arranged on the side of the associated leading edge (20) and spaced apart from each other;

a first connection element (34) arranged on the side of the associated leading edge (20) and interposed between said first ends (37, 38) of the respective first and second elements (31, 32); and a third element (80) connected to the associated said first and second elements (31, 32) and arranged on the side of the leading edge (20);

said first connection element (34) being connected to respective first faces (100) of said first and second elements (31, 32);

said first faces (100) being respectively arranged on the opposite side of said top surface (22) and on the opposite side of said bottom surface (23) of said blade (7);

said blade (7, 14) further comprising a fourth element (70) interposed between said third element (80) and said first connection element (34);

characterized in that said third element (80) is connected to respective second faces (101) opposite to corresponding said first faces (100) of said first and second elements (31, 32);

each said blade (7, 14) being devoid of spars;

said shell (30) of each said blade (7, 14) being filled with a foam or honeycomb material (41) adapted to provide the desired shape to the blade (7, 14).

11. The rotor according to claim 10, characterized in that said fourth element (70) of each said blade (7, 14) is made of composite material and laminated parallel to said axis (B).

12. The rotor according to claim 10, characterized in that said fourth element (70) of each said blade (7, 14) is solid.

13. A hover-capable aircraft (1), comprising at least one rotor (3, 5) according to claim 1.

\* \* \* \* \*